T. BROWN.
MANURE SPREADER.
APPLICATION FILED MAR. 9, 1907.
920,260.
Patented May 4, 1909.
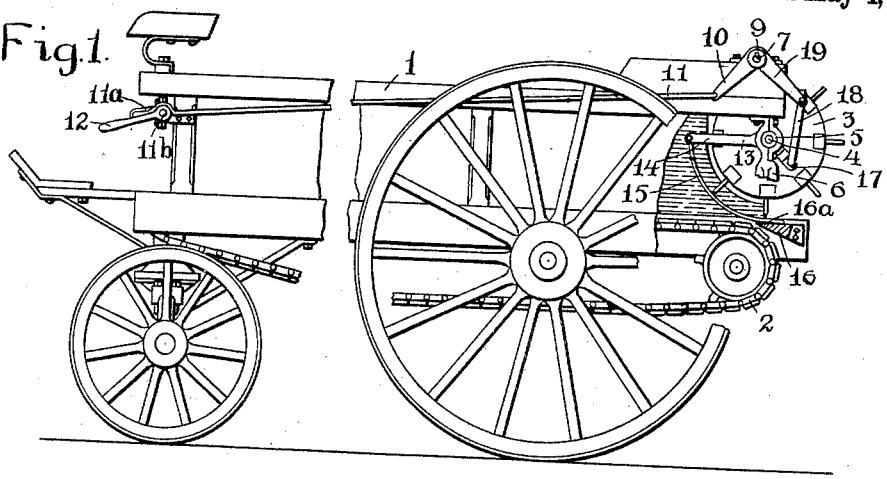
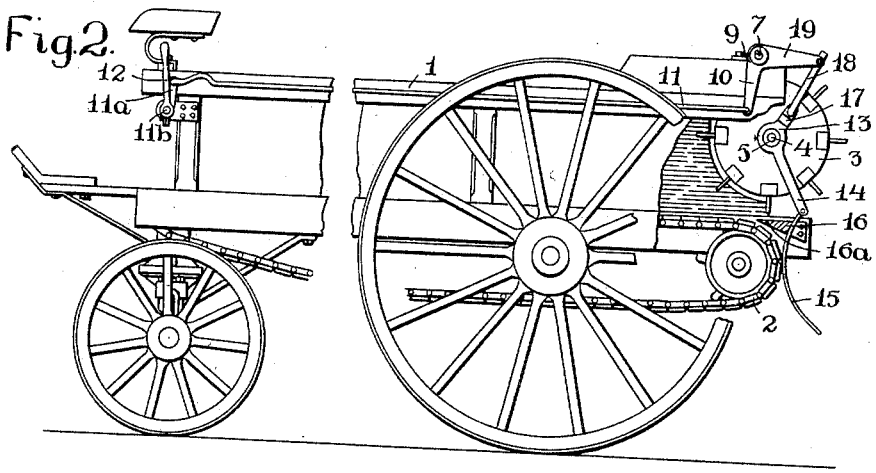
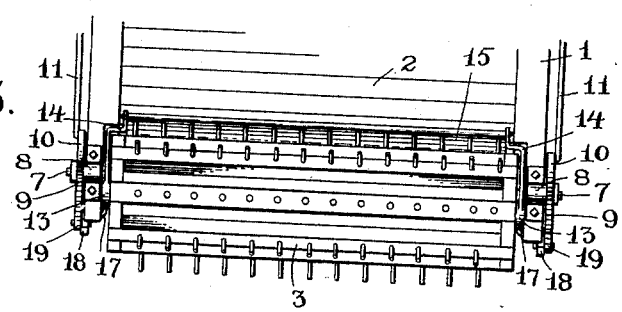
Witnesses
Roy D. Tolman.
Penelope Cumberbach
Inventor
Theophilus Brown.
By Rufus B. Fowler
Attorney

UNITED STATES PATENT OFFICE.

THEOPHILUS BROWN, OF WORCESTER, MASSACHUSETTS, ASSIGNOR TO RICHARDSON MANUFACTURING COMPANY, OF WORCESTER, MASSACHUSETTS, A CORPORATION OF MASSACHUSETTS.

MANURE-SPREADER.

No. 920,260.  Specification of Letters Patent.  Patented May 4, 1909.

Application filed March 9, 1907. Serial No. 361,484.

*To all whom it may concern:*

Be it known that I, THEOPHILUS BROWN, a citizen of the United States, residing at Worcester, in the county of Worcester and Commonwealth of Massachusetts, have invented certain new and useful Improvements in Manure-Spreaders, of which the following is a specification, accompanied by drawings forming a part of the same, in which—

Figure 1 represents a side view of a manure spreader, with a portion of one side removed showing the beater and my improved beater shield in position in front of the beater. Fig. 2 is the same with the beater shield withdrawn, and Fig. 3 is a top view of the beater.

Similar reference letters and figures refer to similar parts in the different views.

My invention relates to a beater shield for the front of the beater of a manure spreader which, when in position between the beater and the load of manure, prevents the pressure of the load against the beater; to means for withdrawing said shield from between the beater and the load when the beater is to be operated, and to means for scraping the movable apron or bottom of the spreader, and my invention comprises the construction and arrangement of parts as hereinafter described and pointed out in the annexed claims.

Referring to the accompanying drawings 1 is the body of the manure spreader provided with a bottom consisting of a traveling apron 2 and a beater 3, mounted on a shaft 4 journaled in hubs 5, held in posts 6 attached to the frame of the spreader. The beater 3 may be revolved in any suitable manner common to manure spreaders of similar construction.

Pivoted on studs 7 mounted on the sides of the spreader above the beater in brackets 8 are bell cranks 9, 9, to the arms 10 of which are attached rods 11, 11, leading to the front of the manure spreader and pivotally attached to arms 11$^a$ on a rock shaft 11$^b$ which is operated from the seat by means of the lever handle 12. Journaled on the hubs 5 between the posts 6 and the end of the beater are bell cranks 13, whose arms 14 extend toward the front of the manure spreader and within its sides. Pivotally attached to the ends of the arms 14 is a shield 15 extending downwardly and rearwardly beneath the beater, its lower end resting upon a support 16 which extends transversely across the spreader and holds the shield 15 out of contact with the traveling apron 2. The support 16 is preferably in the form of a blade with a thin forward edge 16$^a$ adapted to scrape the upper surface of the apron 2 and clear any manure which sticks to the apron and escapes the beater. The shield 15 is shown curved, concentric with the beater and is preferably constructed of sheet metal, but its form and method of construction may be changed without departing from my invention. The other arms 17 of the bell crank 13 are attached by links 18 to the arms 19 of the bell cranks 9.

The operation of my improved beater shield is as follows: By rocking the shaft 11$^b$ the bell cranks 9 are rocked, thereby rocking the bell cranks 13 through the connecting links 18 and withdrawing the shield 15 beneath the beater. The shield 15 is guided by the support 16 until the shield is moved clear of the body of the manure spreader when the shield swings on its pivoted connection with the arms 14 and rests against the support 16, as shown in Fig. 2.

By a reverse movement of the shaft 11$^b$ the shield is drawn up underneath the beater into the position shown in Fig. 1 in which position it is designed to shield the beater from the load of manure when the beater is not in operation. The rods 11 are pivoted to the arms 11$^a$ in such position that when the shield is raised in front of the beater the arms 11$^a$ are below the center of the rock shaft 11$^b$ which locks the shield in its elevated position. When the beater is to be operated the shield is withdrawn as above described. The mass of manure cleared from the apron by the scraper passes over the scraper and into the path of the beater teeth as the beater is revolved.

I claim,

1. A manure spreader, having a beater and a movable shield in front of said beater, supporting arms pivotally attached to the upper edge of said shield, a transverse support for said shield below said beater, and means for rocking said arms downward to carry the upper edge of said shield beyond said transverse support.

2. In a manure spreader, the combination with a beater, of rocking arms, a movable shield with its upper edge pivotally attached to said rocking arms, means for rocking said arms downward to withdraw said shield beneath said beater, said arms arranged to permit said shield to rock on its pivot away from said beater when said shield is moved beyond the body of said manure spreader.

3. In a manure spreader, the combination with a beater and rocking arms, of a movable shield with its upper edge pivotally attached to said rocking arms, means for rocking said arms downward to withdraw said shield beneath said beater, and a transverse scraper beneath said beater arranged to act as a support and guide for the free end of said shield.

4. In a manure spreader, the combination with a beater and rocking arms, of a movable shield with its upper edge pivotally attached to said rocking arms, means for rocking said arms downward to withdraw said shield beneath said beater, means for guiding said shield concentric to said beater until it has passed the end of the manure spreader, said guiding means then arranged to permit said shield to swing on its pivot away from said beater.

5. A manure spreader, having a beater and a movable apron, a movable shield in front of said beater, supporting arms pivotally attached to the upper edge of said shield, a transverse support for said shield below said beater and with one edge adapted to scrape the upper surface of said apron, and means for rocking said arms downward to carry the upper edge of said shield beyond said transverse support.

Dated this fourth day of March, 1907.

THEOPHILUS BROWN.

Witnesses:
PENELOPE COMBERBACH,
RUFUS B. FOWLER.